June 2, 1936. H. A. W. WOOD Re. 19,996

AUTOMATIC SPLICING DEVICE

Original Filed Aug. 11, 1931 5 Sheets-Sheet 1

Inventor
Henry A. Wise Wood
by attorneys
Southgate Fay & Hanley

C. F. Wesson

June 2, 1936. H. A. W. WOOD Re. 19,996

AUTOMATIC SPLICING DEVICE

Original Filed Aug. 11, 1931 5 Sheets-Sheet 2

Inventor
H. A. W. Wood
By Attorneys
Sandlegate Fay & Harris

June 2, 1936. H. A. W. WOOD Re. 19,996
AUTOMATIC SPLICING DEVICE
Original Filed Aug. 11, 1931 5 Sheets-Sheet 3
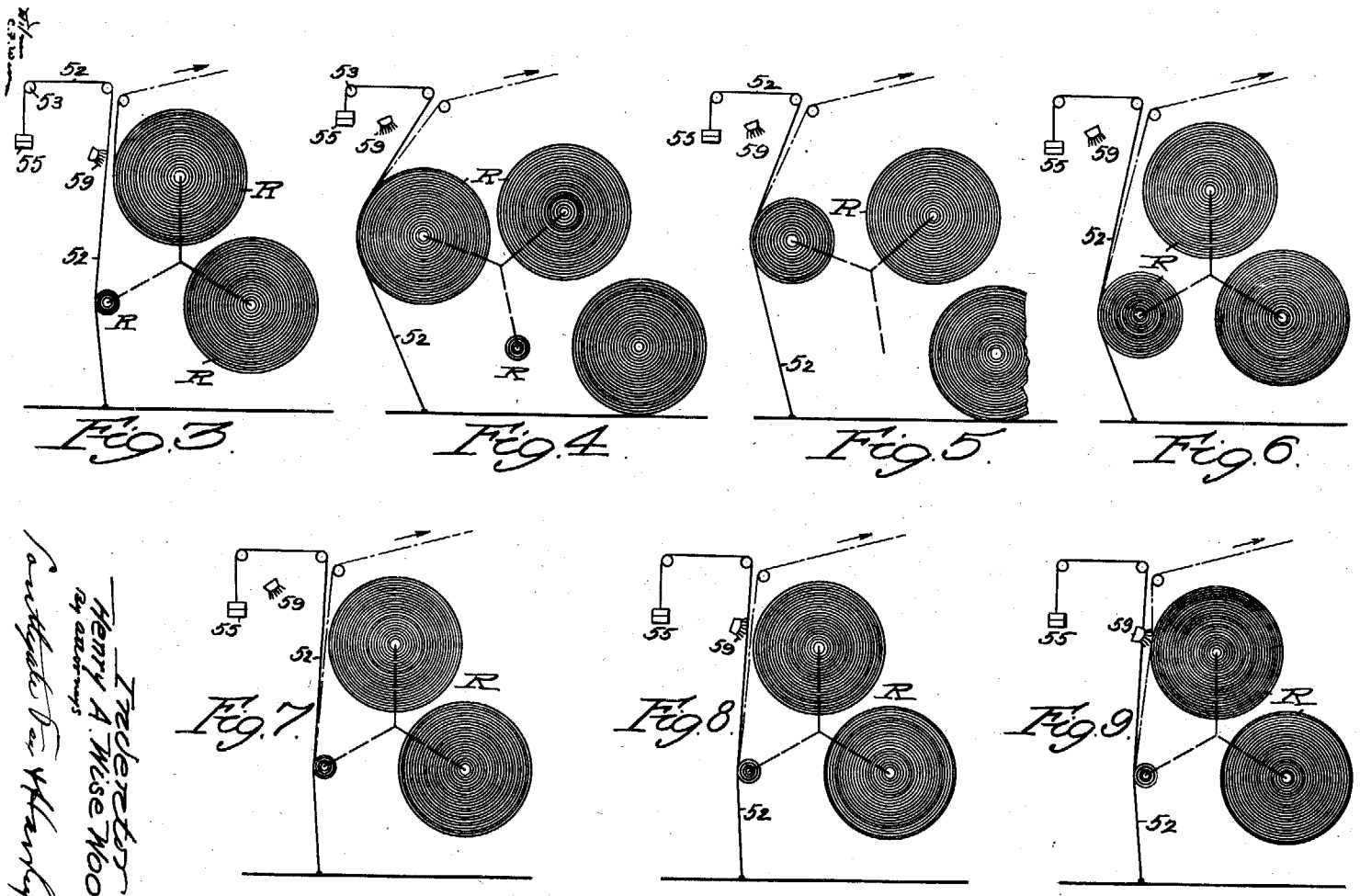
Inventor
Henry A. Wise Wood.
By attorneys
Courtlyate Dew & Harley June 2, 1936. H. A. W. WOOD Re. 19,996

AUTOMATIC SPLICING DEVICE

Original Filed Aug. 11, 1931 5 Sheets-Sheet 4

Witness
C. F. Wesson

Inventor
Henry A. Wise Wood.
By Attorneys.
Southgate Fay & Hardy

June 2, 1936. H. A. W. WOOD Re. 19,996
AUTOMATIC SPLICING DEVICE
Original Filed Aug. 11, 1931 5 Sheets-Sheet 5
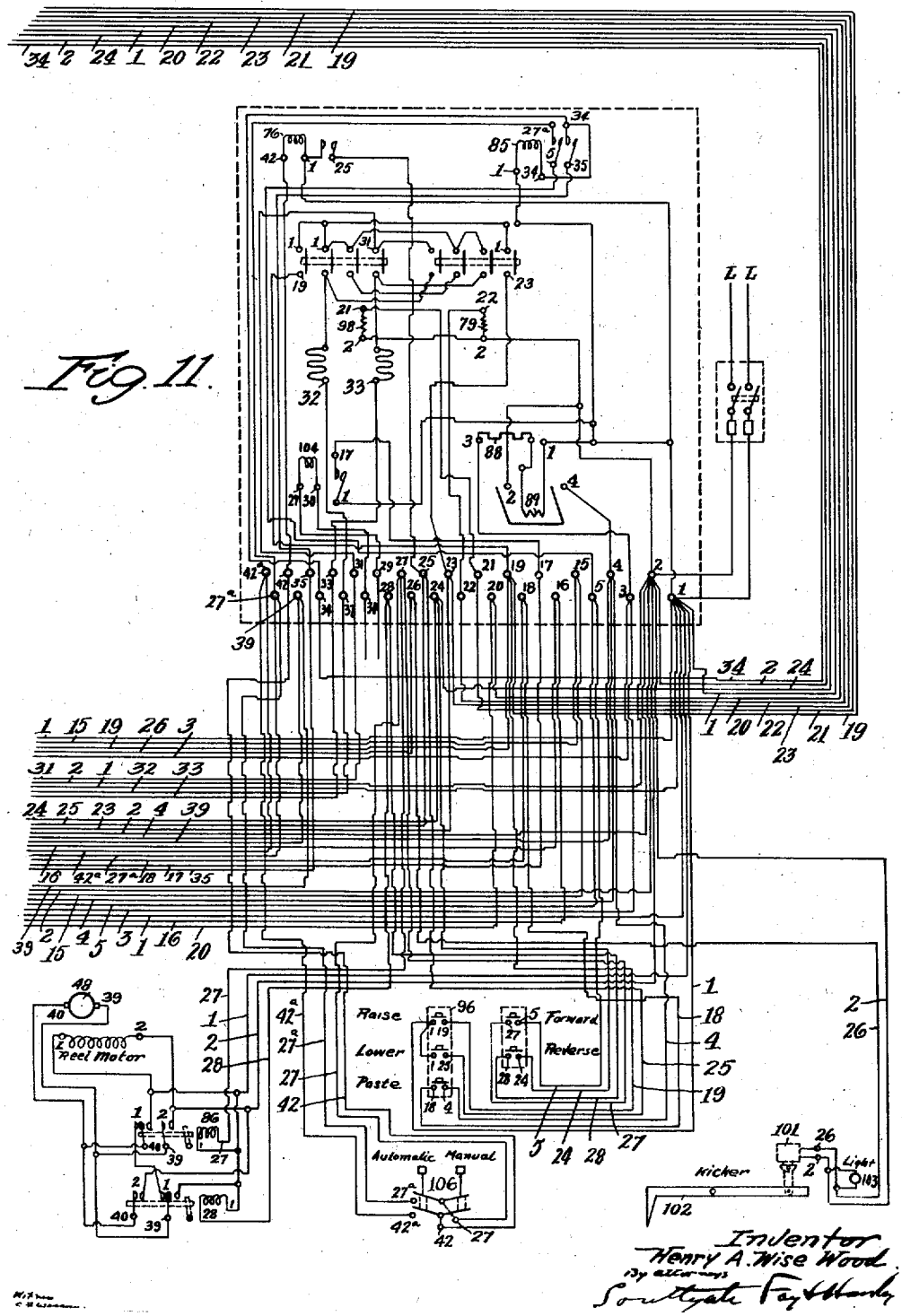

Reissued June 2, 1936 Re. 19,996

UNITED STATES PATENT OFFICE 19,996

AUTOMATIC SPLICING DEVICE

Henry A. Wise Wood, New York, N. Y., assignor to Wood Newspaper Machinery Corporation, New York, N. Y., a corporation of Virginia Original No. 2,032,244, dated February 25, 1936, Serial No. 556,388, August 11, 1931. Application for reissue March 26, 1936, Serial No. 71,076

REISSUED

21 Claims. (Cl. 242—58)

This invention relates to a type of mechanism which is used in splicing web rolls, such as those being fed to large newspaper presses, with no diminution in speed of the press.

The principal object of the invention is to provide for efficient automatic control of the paper roll handling device so that it is not necessary for the operator to attend to any of the operations incident to feeding off the paper or varying tension, his only duties being to remove the old cores, place in new rolls and prepare the forward end of these new rolls for splicing. This relieves the operator of any responsibility in watching the paper roll as it is spliced or used off and insures the proper feeding of the paper to the press in a repetitive manner which makes for uniformity, thereby lessening paper breaks and permitting an operator to prepare more rolls since he is relieved of a large portion of his duties. Other objects of the invention are to provide simple means for shifting from automatic to so-called manual operation, to facilitate loading and to permit of more flexible operation; to provide simple means whereby a button can be pushed at any time and a paster can be made whenever the reel operator decides that it is not safe to use part of the web that would be used if it were allowed to run until small enough for the butt switch lever to pass over its edge, and to provide for making the splice automatically from a larger butt than usual.

Other objects and advantages of the invention will appear hereinafter.

Reference is to be had to the accompanying drawings, in which:

Figs. 3 to 9 are small sketches showing the sequence of operation of this automatic device, and Figs. 10 and 11 constitute the wiring diagram, which show the entire wiring of the machine.

Figure 2:
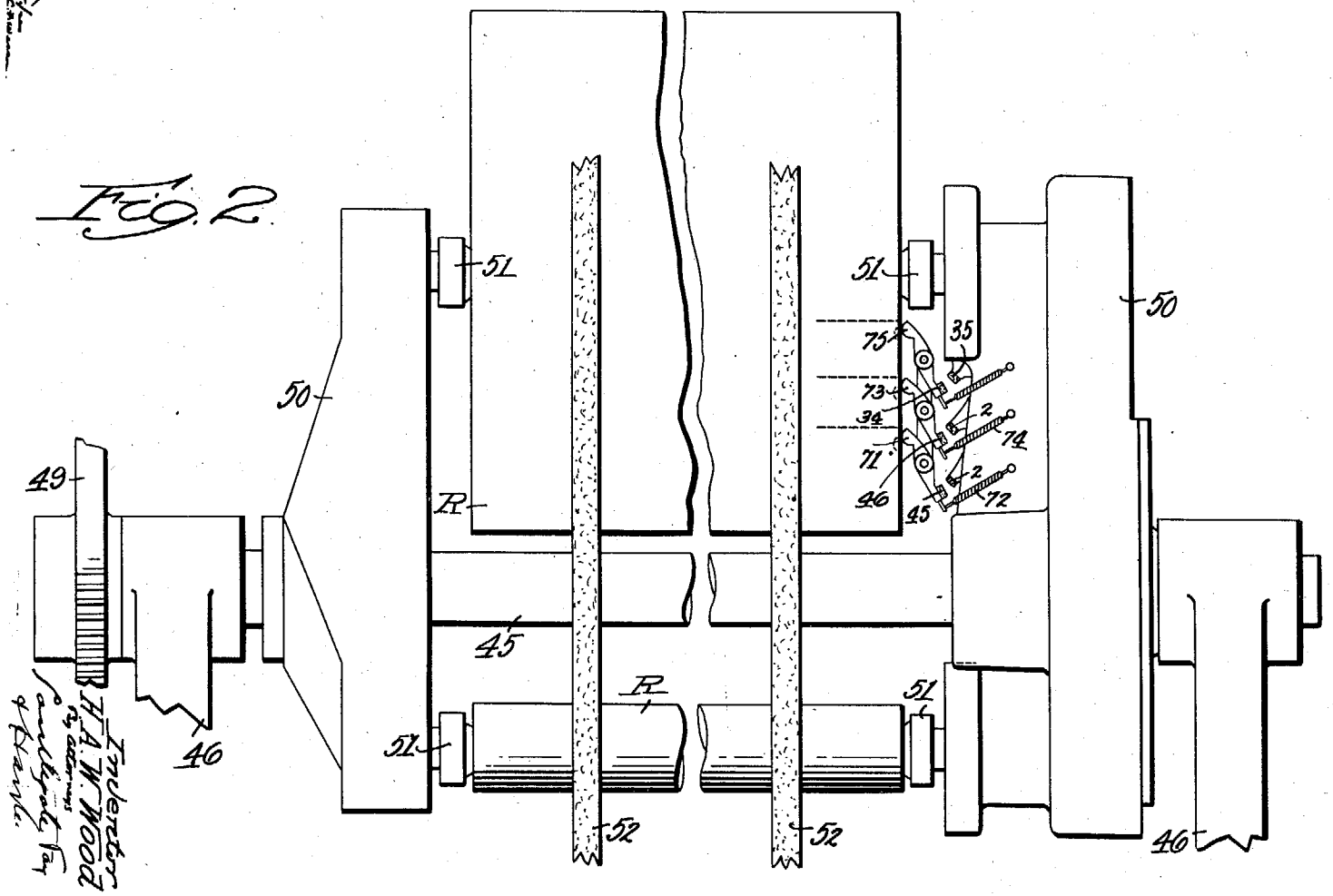
Fig. 2 is an elevation of the device.

In Fig. 2 the shaft 45 is mounted in pedestals 46 adapted to be rotated by reel motor 48 driving worm wheel 49. Spiders 50 carrying a multiplicity of rotatable spindles 51 for the mounting of paper rolls R are mounted on and slidably secured to the shaft 45. The embodiment shown is adapted to carry three such paper rolls. Tension straps 52 are mounted in a conventional manner, one end being secured to the floor, the strap passing over idlers 53 with the other end carrying weights 55. It is understood, of course, that the stationary straps do not form a claim of my invention, except in combination, and that running tension belts may be used as well. By rotating the reel into or out of the straps more or less tension may be applied to the web which is being fed from the paper roll in use.

Figure 1:
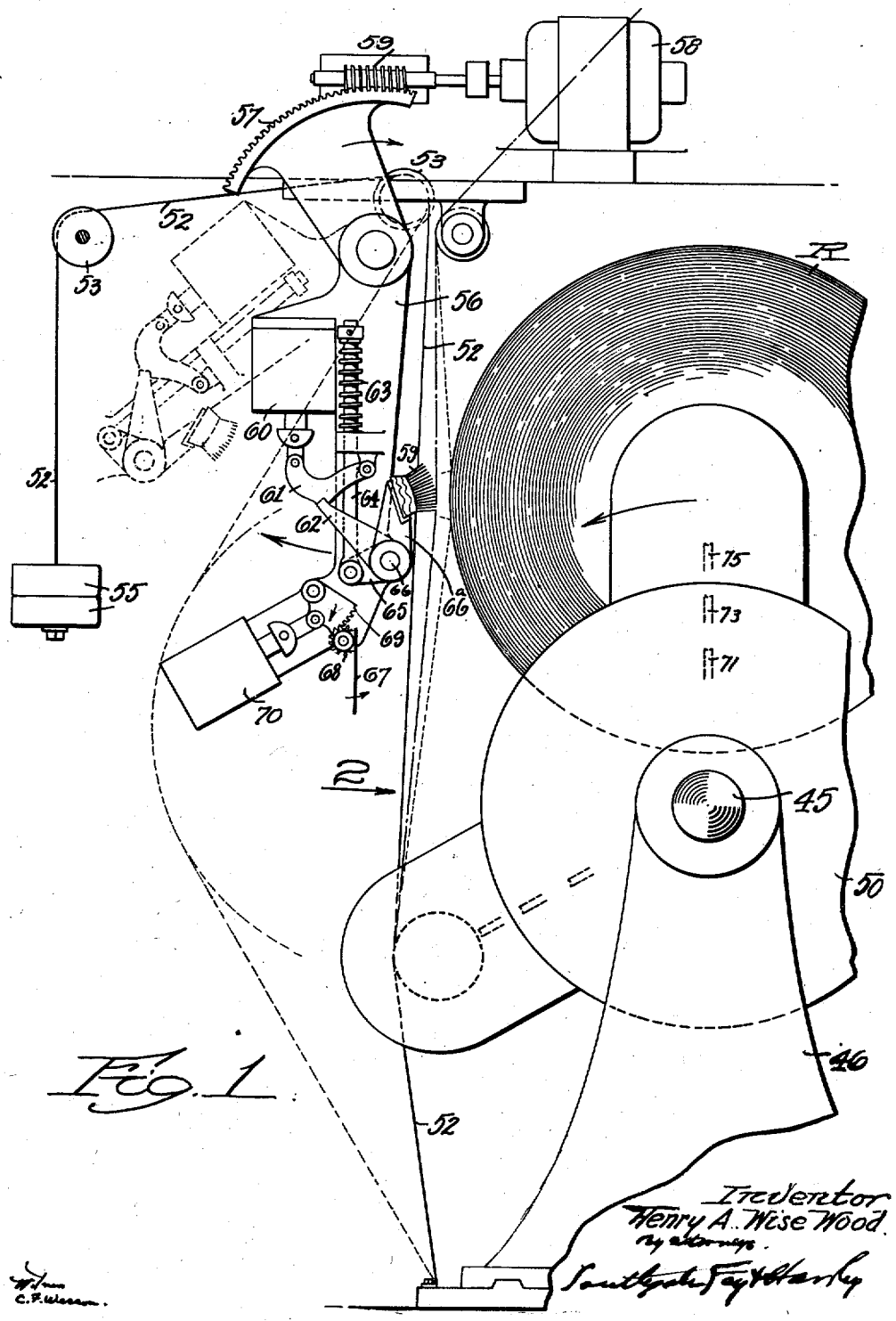
Fig. 1 is an end view of a well-known reel for supporting paper rolls showing this invention applied thereto.

As covered in my former application, Serial No. 443,083, filed April 10, 1930, now Patent No. 1,891,965, December 27, 1932, when one roll is nearly used up, the reel is in the position shown in Fig. 1 where a brush arm 56 is lowered by the counterclockwise rotation of segment 57 which is driven by a motor 58 through worm 59. Suitable stop switches are provided for limiting the motion of this brush arm as will be described later.

At the proper time, as determined by the size of the butt, a pasting brush 59 over which the web travels is allowed to move forward through the action of a brush solenoid 60 tripping a latch 61 abutting a toe 62 so that springs 63 through spring rods 64, arms 65, shaft 66 and arms 66a press the web against the new roll to pick up the paste-covered points, thereby making the splice. It will be understood that, as in my above identified application, the fresh web roll has previously been rotated on its own axis and brought up to web speed. This mechanism is not shown here as it forms no part of this invention and may be operated independently.

After a certain length of paper has been fed off to insure splicing to the new roll, a knife 67, through gear 68, segment 69 and solenoid 70 is rotated into the web, thereby severing the old sheet. After this is accomplished the motor 58 begins rotating in a reverse direction to that described above, lifting the brush arm mechanism to the dotted line position shown in Fig. 1. The reel then moves in a counterclockwise direction until the large new roll has sufficient contact with the tension straps 52 to insure proper tension at which point the reel stops. This position will be approximate to that shown in dotted lines in Fig. 1.

The paper is fed off from this reel position until the roll is approximately one-half the original diameter, at which time the roll switch lever 71 passes over the edge of the roll thereby allowing a spring 72 to close contacts 2 and 45. As will be described later, this causes the reel to rotate to approximately the full line position shown in Fig. 1, from which position the paper is fed to the press until the roll becomes small enough to demand the lowering of the brush arm for another splice.

This automatic setting of the reel position performs two functions; it gives the proper surface contact of the tension straps on a large roll; and, positions the reel so that a magnetic clutch 83 is engaged to assist in retarding this roll suddenly in case of an emergency stop. This braking force on the roll spindle is actuated only when the emergency button is pressed. Selector rings 12 for this braking assistance through the roll spindle are so arranged that as long as the full roll is above say a horizontal line through the reel center, pressing of the emergency button will engage the magnetic clutch on the roll spindle 51 to retard this roll as the press slows down. If, however, the roll is below a horizontal line through the reel center the normal tension members 52 are then sufficient to stop the roll in proper relationship with the press on an emergency button. This device is so arranged that, by the automatic positioning of the reel, when the press is stopped with a small size roll this braking through the spindle is not applied.

When the roll wears down to a certain predetermined size so that it is necessary to lower the brush arm this is done automatically by a switch lever 73 passing over the edge of the roll allowing spring 74 to close contacts 2 and 46. This causes the motor 58 to be energized to lower the brush arm to the proper position. Just as the motor 58 stops rotating, the reel begins to move in a counterclockwise direction until the surface of the incoming roll through an arm (Fig. 10) operates the monkey switch 87, at which time the roll is the proper distance from the brush. The operation of the monkey switch causes the reel to stop rotating. This satisfies one of three conditions necessary to the operation of this mechanism.

The next condition is that the butt be a certain predetermined size and is satisfied when the switch lever 75 passes over the edge of the paper roll closing the contacts 34 and 35. This satisfies the second condition.

The third is that the pasted points on the incoming roll be in a certain angular position when the brush is released. This is accomplished by contact on the incoming roll, the making of which satisfies the last condition, allowing the brush to be snapped forward to press the web against the incoming roll. This completes the cycle of operation and as will be described in conjunction with the wiring diagram, it will be seen that the whole operation is automatic.

The sequence of operations may be understood quite clearly from an inspection of Figs. 3 to 9. Fig. 3 shows the brush arm in the lowered position just after the paster has been made, when the brush is reset and the arm is being raised. Fig. 4 shows the brush arm raised to an inoperative position with the reel in running position for a full size roll, the fresh roll being pressed against the tension strap. Fig. 5 shows the same position with the roll used down to the point where switch lever 71 operates. Fig. 6 shows the reel position a few seconds later when it has shifted so that the running roll is at the lowered position. Fig. 7 shows the roll used down until the switch lever 73 operates to lower the brush. The web from the nearly exhausted roll now runs closely adjacent to the fresh roll. The brush in its lowered position is shown in Fig. 8. Fig. 9 shows the paster being made and the running stub leaving the tension straps while the fresh roll is about to engage them, in conjunction with Fig. 3, which is next in sequence, completes the cycle of operation.

In tracing out the wiring diagram, let it be considered that the reel is in the position shown in Fig. 7, at which point switch lever 73 passes over the edge of the roll to close the contacts 2 and 46 to lower the brush arm 56 representing several contacts, each connected to one side of the line 2 and connected to contact 46 through brush 42*a*. The current goes through the double throw switch 106, determining whether or not the control is manual or automatic, and is connected with the line 42 which energizes the contactor 76. The other side of the line is represented by 1 and several contacts directly connected therewith. This closes contacts 1 and 25 which is equivalent to pressing the "lower" button in push button station 96. Through line 25 which passes through a safety switch 77, demanding that the reel be in the proper position before the brush arm may be lowered, a contact is made with 23 which in turn through a limit switch 78 makes contact with line 22. Line 22 then runs to contactor 79 thereby energizing it, since the other side of the contactor is connected to line 2. This closes the contacts shown directly above contactor 79 to cause the lift motor 58 to rotate in such a manner as to bring the brush arm down to the position shown in Fig. 8.

The cam 80 is geared to and rotates with the brush arm except in the opposite direction. When the cam 80 has rotated to the position shown in Fig. 10, contacts 22 and 23 are opened thereby dropping out the power on contactor 79, causing the lift motor 58 to cease rotation. Just as the cam 80 begins rotating in its clockwise direction, as the brush arm is lowered, contacts 1 and 20 in a switch 81 are closed so that current from one side of the line 1 is transmitted through the line 20, through a rheostat 82 to line 16 which then goes into selector ring 12 and to slip ring 12*a* on the roll spindle and to one side of the magnetic clutch 83, the other side being connected to line 2. This energizes the magnetic clutch which sets in motion the incoming roll.

Figure 10:
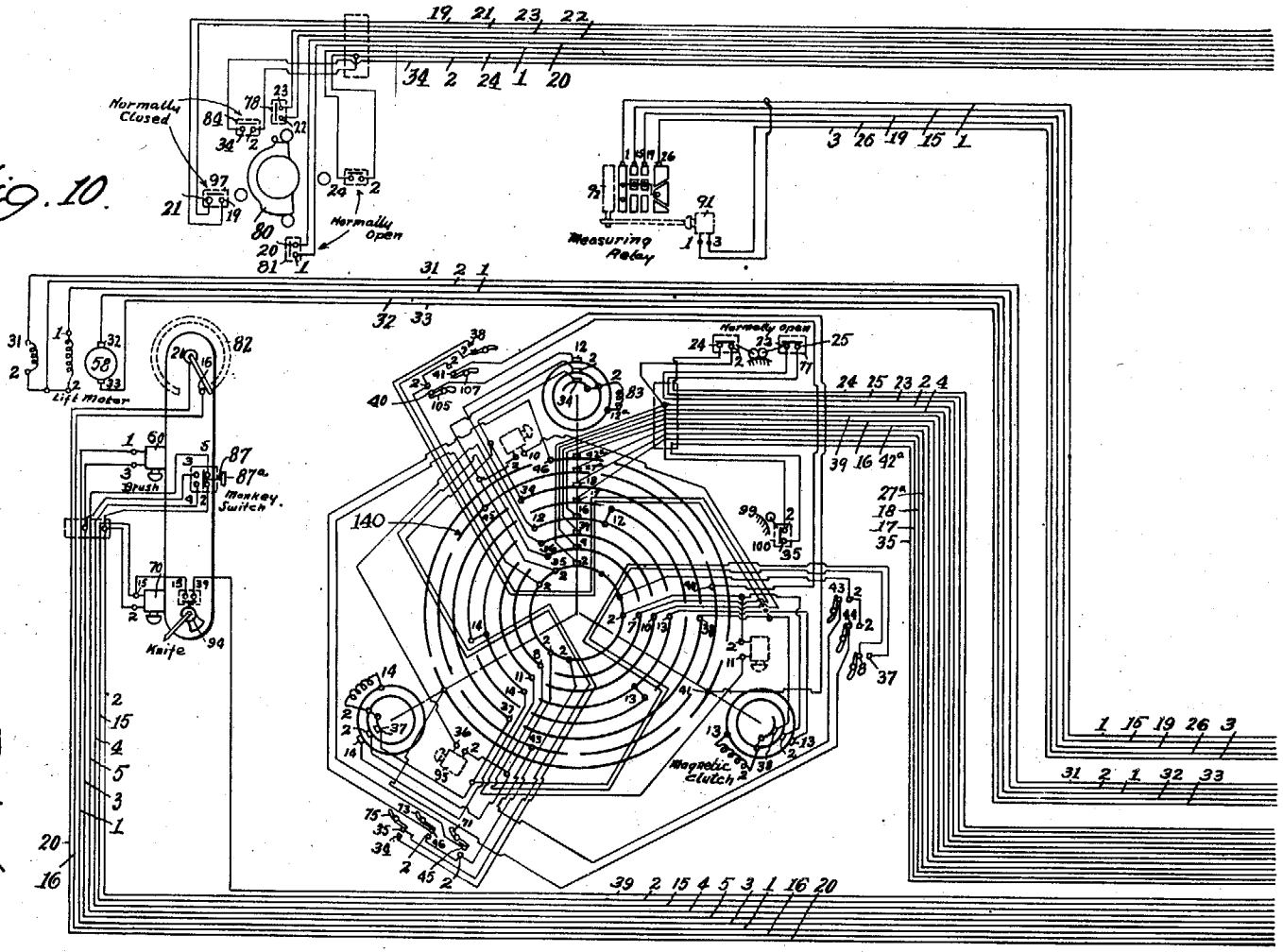

Just before the cam 80 reaches the position shown in Fig. 10, contacts 2 and 34 in the switch 84 are made, the latter contact running to one side of a contactor 85 thereby energizing it since the other side of this contactor is connected to line 1. This closes contacts 27*a* to 5 and 34 to 35. The connecting of contacts 5 and 27*a* is equivalent to pressing the "forward" button 27—5, at push button station 96, causing the reel to rotate in a counterclockwise direction. This is apparent when line 27 is traced over to contactor 86 one side of which is connected to line 1 and contact 5 is traced through monkey switch 87 where it is normally connected to line 2. The energizing of contactor 86 closes contacts 1 and 40, 2 and 39. This rotates the reel in a counterclockwise direction until the surface of the roll bears against a toe 87*a* which operates monkey switch 87. The operation of the monkey switch at this time disconnects contacts 2 and 5, consequently dropping out contactor 86 and stopping the reel motor, and makes contacts 3 and 4. This making of contacts 3 and 4 satisfies one condition demanded before a splice is made; namely, that the roll is the proper distance from the brush.

The second condition to be satisfied is that the butt is the proper size as determined by the operation of butt switch lever 75. After butt switch lever 75 slips over the edge of the roll to close contacts 34 and 35 the very next revolution of the incoming roll causes a circuit to be established from line 2 through brush 34 when the segment 2 comes in contact with it. This may be traced back through the butt switch contacts 34 and 35 to selector ring 35 and brush 4 to the monkey switch where contacts 4 and 3 are connected through resistance 88 to contactor 89 the other side of which is connected to line 1. This energizes contactor 89 closing the contacts 2 and 4.

Simultaneously with the closing of contactor 89 a brush release solenoid 60 is tripped sending the brush and the web which it carries against the incoming roll to pick up the pasted points. It will be noticed that measuring relay solenoid 91 is also connected with lines 1 and 3 and energized at the same time. This releases a drum 92 on which are carried the several contacts shown so that these contacts rotate in direction relationship to the speed of the press.

When the drum 92 has rotated the proper distance to insure picking up the pasted points, brush 15 contacts with the small segment connected to line 1. This places one side of the line on contact 15 which may be traced through to the knife solenoid 93, the other side of which is connected to line 2. This energizes knife solenoid 70 releasing the knife to sever the old web. The rotation of the knife shaft 94 by a projection closes contacts 15 and 39 and by tracing contact 39 through the connection panel to selector ring 36, it will be seen that brake solenoid 95 is energized since its other side is connected to line 2. This places a brake on the butt to prevent its paying off excess paper after the cut is made.

Simultaneous with the operation of the knife, contact 19 of the measuring relay is connected with the segment on drum 92 which is connected to line 1. Tracing through of contact 19 will show that this is equivalent to pressing the "raise" button in push button station 96. This connects one side of the line through limit switch 97 to contact 21 which runs to one side of contactor 98, the other side being connected to line 2. The energizing of this contactor 98 closes the contacts shown just above to rotate lift motor 58 in a direction to lift the brush arm. As the brush arm is lifted to the inoperative position, cam 80, then rotating in a counterclockwise direction, opens contacts 21 and 19. This cuts off the source of power to contactor 98 thereby stopping the lift motor.

This raising of the brush arm undoes some of the things done as the brush arm was lowered. Thus, contacts 1 and 20 in limit switch 81 are broken, thereby deenergizing magnetic clutch 83. Before this is done, however, rheostat 82 performs its function of reducing the voltage on the magnetic clutch as the brush arm is being raised, thereby releasing the tension caused by the magnetic clutch in a gradual manner. The final disengagement of the clutch, however, is through the opening of contacts 1 and 20 in limit switch 81 and is caused by the rotation of the cam 80. During the course of lifting the brush arm, monkey switch 87 is reset, thereby breaking contacts 3 and 4 which allows contactor 89 and solenoids 60 and 91 to be deenergized. Since contactor 85 is held in through its own contacts 34 and 35 the resetting of monkey switch 87, closing contacts 2 and 5, causes the reel motor 48 to rotate sending the reel in a counterclockwise direction. This continues until projection 99 on the reel spider contacts with a switch roller of a switch 100 to break contacts 2 and 35. This breaks the circuit feeding contactor 85 dropping it out thereby stopping the reel in the position shown in Fig. 4

Meanwhile the drum 92 has been rotating in direct relationship to the press. When the wedge-shaped segment which is connected to line 1 contacts with contact 26, one side of the line is placed on this contact which may be traced to kicker solenoid 101, the other side of which is connected to line 2. This energizes the kicker solenoid moving kicker 102 to such a position that it sets askew the pasted papers on the delivery.

Signal light or lights 103 are provided which may be placed at the delivery of the press in the mailing room or any other convenient place to announce that a paster has been made. When the contactor passes off of the wedge-shaped segment, kicker solenoid 101 is deenergized and kicked 102 returns to its normal inoperative position.

The splice has now been made, the old web severed, the butt stopped, the brush arm lifted to the inoperative position, the papers on the delivery marked to distinguish them, and the new roll is running in the position illustrated in Fig. 4. As long as the reel is in this position selector ring 12 contacts brush 17. With the reel so positioned, in event of an emergency stop of the press, contactor 104 is energized, since the terminals are connected across the dynamic brake resistance of the press motor (not shown) closing contacts 1 and 17. Tracing through contact 17 to selector ring 12 it will be found that this energized magnetic clutch 83 which takes a grip on the roll spindle assists the normal tension straps in bringing the roll to a stop in proper relation to the press without a sheet break. This particular feature I have covered in a former application, Serial No. 542,865, filed June 18, 1931.

As the press uses paper, the size of roll R diminishes until lever 105 (similar to 71) passes over the edge of the paper to close contacts 2 and 40. Contact 2, being one side of the power, may be traced through contact 40 to selector ring 140, through brush 27*a* to double-throw switch 106 where it connects to line 27 and thence to one side of contactor 86, the other side being connected to line 1. This energizes contactor 86 closing contacts to cause motor 48 to rotate the reel in a counterclockwise direction. This continues until brush 27*a* passes off the right hand end of the selector ring 140 due to which contactor 86 is deenergized and the reel stops in the position shown in Fig. 6. In case of an emergency stop with the reel in this position contactor 104 is closed as before but brush 27*a* then connects with a dead segment and therefore no completed circuit is established to the magnetic clutch of any spindle, the tension of normal tension members 52 being sufficient to stop the roll properly.

Paper continues to be used from roll R until lever 107 (similar to 73) passes over the edge of the roll closing contacts 2 and 41 to lower the brush arm and repeat the cycle.

In push button station 96 an optional button marked "Paste" is provided which connects contacts 4 and 18. By tracing these lines back to the brushes operating on the selector segments of the reel it will be seen that this provides a short circuit across the contacts serving the butt switch, such as 34 and 35 which is normally operated by switch lever 75. This "Paste" button is provided so that the reel operator, when in his judgement the butt may not be safely used down to the point where the butt switch lever passes over the edge of the roll, may press it, shorting out the butt switch, and obtain the splice within one revolution of the incoming roll. In a former application, Serial No. 544,762, filed June 16, 1931, I have provided for adjustability of this butt switch 75 so that an operator may judge the condition of the roll and regulate the switch to leave more or less paper on the butt accordingly. This "Paste" button provides still an additional regulation in that the splice may be made from a larger butt than the adjustable butt switch would normally accommodate or permit an operator to quickly make a splice should something untoward or unexpected happen to or show up as the butt is being used.

A double pole, double throw, switch 106 is provided to permit a shift from automatic to manual operation and back by simply pushing a button. A shift to manual control, through the opening of contact 42*a*, causes contactor 76 to become inoperative thus eliminating the automatic lowering of the brush arm; also, through the opening of contact 27*a* the automatic operation of the reel to its respective positions is eliminated. This latter feature is especially desirable since in the loading of rolls the reel is frequently moved back and forth to facilitate loading. After a new roll has been loaded the button marked "Automatic" is then pressed to remake contacts 27 and 27*a*, 42 and 42*a*, and the device resumes its automatic operation as described above.

It is, therefore, obvious that a splicing mechanism is provided which automatically performs all the functions incident to splicing a web, including severing of the old web, braking the butt, lowering and lifting the brush arm, indicating the pasted papers on the delivery, and positioning the reel to provide proper tension of the paper, not only during normal running conditions but on emergency stops, without any attention on the part of the operator. His duties are only those of removing used butts and loading and preparing new rolls for splicing. Further, provisions are made for a simple shift from automatic to so-called manual operation of the device to facilitate loading of the reel and to permit of more flexible operation.

It is entirely within the scope of this invention that additional switch levers, operating either against the end of the surface of the roll, be used to cause the reel to be stopped at a greater number of operating positions or even that levers or contacts be operated from some such tension device as a "floating roller" to cause the reel to move into or out of the belts or straps in automatic response to changes of tension.

Although I have illustrated and described only one form of the invention I am aware of the fact that modifications can be made therein by any person skilled in the art without departing from the scope of the invention as expressed in the claims. Therefore, I do not wish to be limited in this respect, but what I do claim is:—

1. In a web splicing machine, the combination with a reel for supporting web rolls and means for operating the reel to move the rolls, of electrically operated means for starting and stopping the operation of the reel in a predetermined order to bring the rolls successively into the several positions for the various operations of splicing to take place, a kicker solenoid, and means operated by said electrically controlled means for energizing the kicker solenoid to set askew a product on the delivery at equal intervals.

2. In a machine for feeding a web to a printing machine and splicing it, the combination with a movable web roll support and means for operating it to move the web rolls, of means for controlling the motions of the support to bring the running rolls successively and repeatedly from the running position into position to direct the web therefrom closely adjacent to a fresh roll preparatory to splicing the running web to the fresh roll, means for pressing the running web out of its normal path against the pasted fresh roll for splicing, means for controlling the last named means, means controlled by the first named electric means for starting the operation of the controlling means, and means for rendering the operation of the last named means inoperative, to permit hand operation thereof.

3. In a web feeding device, the combination with means for supporting a running roll and a fresh roll and means for operating it to move the rolls bodily, of means for controlling the operating means to bring the running roll successively into running position for the web therefrom to run closely adjacent to the surface of a fresh web roll in splicing position, means for pressing the web out of its normal path against the pasted fresh roll, means whereby the diminution in diameter of the running roll will operate the last named means automatically, a push button, and means controlled by the push button for rendering inoperative said last named automatic means for making a splice from a larger butt than usual, when desired.

4. In a web supply mechanism, a support for a running web roll and a replacement roll, means for accelerating the replacement roll to a peripheral speed substantially equal to that of the running roll, means for pressing the running web against the replacement roll when in running position to make a web join, actuating means mounted on the support and operated automatically when the running roll approaches exhaustion, and a timer moving in synchronism with the replacement roll and adapted to cooperate with the said actuating means to control the operation of the pressing means to make the join.

5. In a web supply mechanism, a support for a running web roll and a replacement roll having adhesive on its web end, a first actuating means operated automatically when the running roll is partially exhausted for operating the roll support to move the running roll away from running position and move the replacement roll to running position preparatory to making a web join, means for accelerating the replacement roll to a peripheral speed substantially equal to that of the running web, web shifting means for moving the running web against the replacement roll in running position, a second actuating means operated automatically when the running roll approaches exhaustion, and a timer moving in synchronism with the replacement roll and adapted to cooperate with said second actuating means to control the operation of the shifting means to make the join.

6. In a web supply mechanism, a web deflector, means for moving the deflector into contact with the running web, a latch adapted to hold the deflector against a bias tending to force it toward the web, and electro-responsive means actuated by a reduction in the diameter of a running roll and in running engagement therewith for releasing the latch.

7. In apparatus of the character described, the combination of movable means for supporting a plurality of rolls of paper, means for driving a fresh roll having adhesive thereon to rotate the same and bring it up to the speed of the traveling web from an expiring roll, means for effecting contact of the rotating fresh roll and the traveling web from the expiring roll to make a paster, and means for cutting off said web comprising a shaft, a cutting element thereon, a motor for turning said shaft, and means for automatically energizing said motor to operate said cutting element a predetermined and unvarying distance behind the paster.

8. In a machine for splicing a running web, the combination of a rotatable web roll support capable of supporting a plurality of web rolls including a running web roll and a fresh web roll, a pasting brush movable from inoperative position to an intermediate postion, means for speeding up the fresh web roll, means for rotating the support to bring the fresh web roll to splicing position adjacent to the running web and stopping rotation of the support, and a circuit completing device adapted to operate after the fresh web roll has been placed in splicing position and has made more than one full revolution to permit the brush to press the running web against the fresh web roll to make a splice.

9. In a machine for splicing a running web, the combination of a rotatable web roll support capable of supporting a plurality of web rolls including a running web roll and a fresh web roll, a pasting brush movable from inoperative position to an intermediate position, means for speeding up the fresh web roll, means for rotating the support to bring the fresh web roll to splicing position adjacent to the running web and stopping rotation of the support, a timer moving in synchronism with the fresh web roll, and a circuit completing device adapted to operate after the fresh web roll has been placed in splicing position and has made more than one full revolution to permit the brush to press the running web against the fresh web roll to make a splice.

10. In a machine for splicing a running web, the combination of a rotatable web roll support capable of supporting a plurality of web rolls including a running web roll and a fresh web roll, a pasting brush movable from inoperative position to an intermediate position, means for speeding up the fresh web roll, means for placing the roll in splicing position adjacent to the running web, and a circuit completing device adapted to operate after the fresh web roll has been placed in splicing position and has made more than one full revolution to permit the brush to press the running web against the fresh web roll to make a splice.

11. In a machine for splicing a running web, the combination of a rotatable web roll support capable of supporting a plurality of web rolls including a running web roll and a fresh web roll, a pasting brush movable from inoperative position to an intermediate position, means for speeding up the fresh web roll, means for placing the roll in splicing position adjacent to the running web, a timer moving in synchronism with the fresh web roll, and a circuit completing device adapted to operate after the fresh web roll has been placed in splicing position and has made more than one full revolution to permit the brush to press the running web against the fresh web roll to make a splice.

12. In a web supply mechanism, a rotatable web roll support provided with rotating mechanism and adapted to rotatably carry a running roll and a replacement roll, and control means for said rotating mechanism mounted on the support and adapted to rotate said support when the running roll is reduced to a predetermined diameter and means operated by the motion of the support to stop said support when the replacement roll is in splicing position adjacent the running web.

13. In a web supply mechanism, a support for a running web roll and a replacement roll, a brush arm, actuating means operated automatically when the running roll is partially exhausted for rotating the roll support to move the replacement roll into position for lowering the brush arm, means controlled by the running roll for lowering the brush arm and rotating the roll support to move the replacement roll into position for making a web join, means governed by the diameter of the replacement roll for stopping the support automatically when the periphery of the replacement roll reaches a position near the web running from the running roll, and a brush arranged to press the running web against the replacement roll to make the join.

14. In a web supply mechanism, a support for a running web roll and a replacement roll having adhesive on its outer web end, means for accelerating the replacement roll to a peripheral speed substantially equal to that of the running roll, web shifting means for moving a web from the running roll against the replacement roll, actuating means on the support and including a finger engaging each roll, and a timer moving in synchronism with the replacement roll and adapted to cooperate with the said actuating means to control the operation of the shifting means when the running roll approaches exhaustion.

15. In a web supply mechanism, a rotatable support for a running web roll and a replacement roll, a motor for rotating the support to bring the periphery of the replacement roll near the running web, a web deflector adapted to press the running web against the surface of the replacement roll, feelers bearing on the rolls, and means governed by the feelers to start and to stop the motor and to control the operation of the web deflector.

16. In a mechanism for supplying a web to a printing machine, a rotatable carrier for supporting a plurality of web rolls and adjustable to receive rolls of varying length, means responsive to reduction of the running roll to initiate the operation of changing the web feed from a roll carried by one end of the carrier to a roll carried by another end of the carrier, means associated with each end of the carrier for initiating a phase in the web renewal operation in dependence on the angular position of the roll of the corresponding carrier, and a selector device for rendering the last mentioned means respectively operative in dependence on the positions of the carriers relative to a normal running position.

17. In a machine for splicing a running web, the combination of a rotatable web roll support capable of supporting a plurality of web rolls including a running web roll and a fresh web roll, an electrical circuit, a pasting brush movable from inoperative position to an intermediate position, means for speeding up the fresh web roll, means for rotating the support to place the fresh web roll in splicing position adjacent to the running web, and a push button so arranged in the circuit that it may be operated after the fresh web roll has been placed in splicing position and has made more than one full revolution to permit the brush to press the running web against the fresh web roll to make a splice.

18. In a machine for splicing a running web, the combination of a rotatable web roll support capable of supporting a plurality of web rolls including a running web roll and a fresh web roll, an electrical circuit, a pasting brush movable from inoperative position to an intermediate position, means for speeding up the fresh web roll, means for rotating the support to place the fresh web roll in splicing position adjacent to the running web, a timer moving in synchronism with the fresh web roll, and a push button so arranged in the circuit that it may be operated after the fresh web roll has been placed in splicing position and has made more than one full revolution to permit the brush to press the running web against the fresh web roll to make a splice.

19. In a machine for splicing a running web, the combination of a rotatable web roll support capable of supporting a plurality of web rolls including a running web roll and a fresh web roll, a pasting brush movable from inoperative position to an intermediate position, means for speeding up the fresh web roll, means for rotating the support to place the fresh web roll in splicing position adjacent to the running web, and means which are operated after the fresh web roll has been placed in splicing position and has made more than one full revolution, to permit the brush to press the running web against the fresh web roll to make a splice.

20. In a web splicing device, the combination with means for supporting a fresh web roll, means for rotating the fresh web roll through its axis, a magnetic clutch for controlling the last named means, and means for supplying a current to the magnetic clutch gradually, to give a smooth acceleration to the fresh roll and a gradual deceleration.

21. In a web splicing device, the combination with means for supporting a fresh web roll, and means for rotating the fresh web roll through its axis, of a magnetic clutch for controlling the last named means, means for applying a current to the magnetic clutch gradually to give a smooth acceleration to the fresh roll, tension straps for engaging the said web roll after splicing, and means for gradually throwing out the magnetic clutch while the tension straps are also taking effect on the roll gradually.

HENRY A. WISE WOOD.